US008681991B2

(12) United States Patent
Kuster et al.

(10) Patent No.: US 8,681,991 B2
(45) Date of Patent: Mar. 25, 2014

(54) SYSTEM AND METHOD FOR PROVIDING USER MEDIA

(75) Inventors: Christian Kuster, Wernetshausen/ZH (CH); Mike Segmüller, Warth/TG (CH)

(73) Assignee: KABA AG, Wetzikon (CH)

( * ) Notice: Subject to any disclaimer, the term of this patent is extended or adjusted under 35 U.S.C. 154(b) by 542 days.

(21) Appl. No.: 12/935,714

(22) PCT Filed: Mar. 31, 2009

(86) PCT No.: PCT/CH2009/000108
§ 371 (c)(1),
(2), (4) Date: Nov. 11, 2010

(87) PCT Pub. No.: WO2009/121197
PCT Pub. Date: Oct. 8, 2009

(65) Prior Publication Data
US 2011/0113255 A1    May 12, 2011

(30) Foreign Application Priority Data

Apr. 1, 2008  (CH) ........................................ 489/08

(51) Int. Cl.
| | |
|---|---|
| *G06F 21/00* | (2013.01) |
| *H04L 9/08* | (2006.01) |
| *G06F 21/34* | (2013.01) |
| *G06Q 20/02* | (2012.01) |
| *G06Q 20/34* | (2012.01) |
| *G06Q 20/38* | (2012.01) |

(52) U.S. Cl.
CPC ................ *H04L 9/08* (2013.01); *H04L 9/0819* (2013.01); *G06F 21/34* (2013.01); *G06Q 20/02* (2013.01); *G06Q 20/341* (2013.01); *G06Q 20/3829* (2013.01)

USPC .......................................................... 380/277

(58) Field of Classification Search
USPC ............................................................. 713/1
See application file for complete search history.

(56) References Cited

U.S. PATENT DOCUMENTS

| | | | |
|---|---|---|---|
| 4,811,393 A | | 3/1989 | Hazard |
| 4,910,773 A | | 3/1990 | Hazard et al. |
| 5,555,309 A | * | 9/1996 | Kruys ........................... 380/280 |
| 5,633,930 A | * | 5/1997 | Davis et al. ..................... 705/68 |
| 6,014,748 A | * | 1/2000 | Tushie et al. ...................... 726/9 |
| 6,157,722 A | * | 12/2000 | Lerner et al. ................... 380/260 |
| 6,736,313 B1 | * | 5/2004 | Dickson ........................ 235/380 |
| 6,738,900 B1 | * | 5/2004 | Hardjono et al. ............. 713/156 |

(Continued)

FOREIGN PATENT DOCUMENTS

| | | |
|---|---|---|
| FR | 2 875 656 | 3/2006 |
| WO | 99/19846 | 4/1999 |

*Primary Examiner* — Andrew Goldberg
(74) *Attorney, Agent, or Firm* — Rankin, Hill & Clark LLP (57) ABSTRACT

An identification system includes at least one user medium, which is equipped to store a derived key and authenticate itself using the same with respect to a write and/or read device. Furthermore, at least one key dispensing medium is present, which comprises a monolithic first integrated circuit having storage means and processor means, wherein the first integrated circuit is equipped to store a source key and derive therefrom the derived key and to pass it on for storage in the user medium, wherein the user medium is enabled neither directly nor by way of aids to read the source key from the key dispensing medium and/or the user medium is not enabled to calculate a derived key.

19 Claims, 3 Drawing Sheets

(56) References Cited

U.S. PATENT DOCUMENTS

| | | | |
|---|---|---|---|
| 6,859,535 B1* | 2/2005 | Tatebayashi et al. | 380/201 |
| 7,836,300 B2* | 11/2010 | Dellow et al. | 713/163 |
| 2002/0044657 A1* | 4/2002 | Asano et al. | 380/201 |
| 2003/0111528 A1* | 6/2003 | Sato et al. | 235/380 |
| 2003/0145203 A1* | 7/2003 | Audebert et al. | 713/169 |
| 2004/0103276 A1* | 5/2004 | Jing et al. | 713/156 |
| 2004/0193898 A1* | 9/2004 | Ochi et al. | 713/189 |
| 2005/0069139 A1* | 3/2005 | Higurashi | 380/284 |
| 2005/0172137 A1* | 8/2005 | Hopkins | 713/185 |
| 2006/0010324 A1* | 1/2006 | Appenzeller et al. | 713/171 |
| 2006/0090082 A1* | 4/2006 | Apostolopoulos | 713/189 |
| 2007/0094505 A1* | 4/2007 | Futa et al. | 713/176 |
| 2007/0251997 A1* | 11/2007 | Brown et al. | 235/380 |
| 2008/0052770 A1* | 2/2008 | Ali et al. | 726/9 |
| 2008/0163361 A1* | 7/2008 | Davis et al. | 726/19 |

* cited by examiner

SYSTEM AND METHOD FOR PROVIDING USER MEDIA

BACKGROUND OF THE INVENTION

1. Field of the Invention

The invention relates to the field of identification technology, as is used for security and data storage media systems, for example. It relates particularly to a system and a method for producing user media in an identification system.

2. Description of Related Art

Identification systems (often the term "authentication system" would be more correct) are used for different applications such as access control (in what are known as 'online' systems, in which an object for which access is being controlled is in contact with a central unit, and in 'offline' systems, in which this is not the case), prepaid card systems, data acquisition systems, etc.

Usually, the identification systems have user media—for example "Smart Cards"—which are provided with a data memory which stores a suitable electronic key. In application, data interchange takes place—usually without physical contact—with a read and/or write device, wherein the electronic key is used to perform an authentication process and the desired action—for example the release of an object, the purchase of an item or service, the writing of a piece of information to the user medium, etc.—is performed successfully only if the electronic key is established to be correct in the read and/or write device or possibly in the user medium, or the result of a computation operation on the basis of the key produces a desired value.

A frequently chosen approach is for the common electronic key to be stored on all user media and for the electronic key to be known to all read and/or write devices in a system. This is a good solution for small, straightforward systems. However, it makes no sense in larger systems, for if a medium or the key is lost and (possibly) reaches an unauthorized person, all elements of the system need to be reprogrammed with a new key.

An alternative approach is to provide what is known as a "Site Key" or "Master Key" which is used as a basis for calculating the electronic keys. The electronic keys for the various media differ from each other, only the 'Master Key' is common. The 'Master Key' is never used for identification, and it cannot be calculated from the keys.

This alternative approach makes it possible such that not all elements of the system to have to be reprogrammed in the event of loss of a medium, but rather only particular applications which are affected by the loss. However, some significant drawbacks remain as user media are generally initialized, and have information written to them, by a computer which must contain the master key. This is a security risk because the whole system is endangered if the master key is copied. For this reason, media in such systems are issued by central certification offices—for example provided by the vendor of the entire identification system—and these central certification offices never issue the master key. Although satisfactory security devices at the central certification offices warrant the required security to a certain extent, the procurement of new media is complicated and—as a result of the involvement of the central certification office—also expensive. Furthermore, there is always the residual risk of abuse by persons working at the certification office.

A system with a central certification office for applications in the banking sector or the like is described in U.S. Pat. Nos. 4,811,393 and 4,910,773, for example. In accordance with this teaching, 'User Cards' (user media) are provided which are also in the form of security modules whose memory can be accessed only by the dedicated module processor, for example. The user media are used to store a derived key (diversified key) which has been determined from a base key. This system also requires a central certification office and is furthermore also costly because all user media need to be designed in hardware as security modules with appropriate processors and data memories.

BRIEF SUMMARY OF THE INVENTION

It is an object of the invention to provide approaches which remedy this situation.

The present case provides an identification system comprising at least one key dispenser medium with a first integrated circuit and at least one user medium. The first integrated circuit comprises memory means and processor means which are preferably monolithically integrated. It is equipped to store a source key ("Site Key") and to calculate keys derived therefrom, wherein the hardware of the key dispenser medium preferably does not allow the unencrypted source key to be read. The user medium may have a second integrated circuit and is equipped to store a derived key and to perform an authentication process on the basis of this derived key together with a read and/or write device.

The monolithic integration of the first integrated circuit, which, besides the memory for the source key, also contains the processor means for calculating the derived key, is advantageous in that no data allowing calculation of the source key need to leave the integrated circuit in order to calculate the derived key.

According to a first property of preferred embodiments of the invention, the read and/or write device has a third integrated circuit, which, like the key dispenser medium, is equipped to store a source key ("Site Key") and to calculate keys derived therefrom.

In this case, the hardware of the read and/or write device preferably does not allow the unencrypted source key to be read and, for example, also does not allow encrypted data comprising the source key to be issued, and/or, for example, also does not allow derived keys to be issued. The latter are calculated exclusively in order to perform the authentication process together with the user media, which of course also comprises this derived key. However, provision may also be made for the third integrated circuit to forward the derived key to another element of the read and/or write device, which then, for its part, performs the authentication process with the user medium.

With particular preference, the third integrated circuit is of physically identical design to the first integrated circuit and differs therefrom only in that it is configured differently.

In line with a second property of preferred embodiments of the invention, the key dispenser medium and the user medium are now of physically different design such that the user medium is able to read the source key or ascertain it in another way neither directly nor using means (for example an interposed computer) and/or that the user medium is unable to calculate a derived key.

By way of example, the first integrated circuit and the second integrated circuit may be designed with such different hardware that the first integrated circuit is able to perform operations (calculations etc.) which the second integrated circuit is not at all able to perform.

This approach has the important advantage that holders of user media cannot turn them into a key dispenser, not even by means of illegal actions. The key dispensers can be kept in a small number and inspected at any time.

In some embodiments of the invention, the identification system has at least two different communication channels which are fundamentally distinguished by the physics of the signal transmission and/or by the protocols used. Thus, by way of example, provision may be made for the key dispenser media to be able to be read exclusively in a contact-based fashion, while the communication between user media and read and/or write device is effected contactlessly, for example by means of radio frequency waves (RFID) or other electromagnetic waves, inductively or capacitively/resistively. The use of electromagnetic waves for the data interchange both with the key dispenser media and with the user media, but using different frequencies and/or different protocols, is also conceivable.

Preferably, identification systems based on these embodiments are designed such that user media have different data interchange interfaces than the key dispensers, i.e. the different communication channels mean that the user media cannot read data which are sent by key dispenser media on at least one available communication channel.

The approach in line with these embodiments enhances advantages which are obtained on the basis of the second advantageous property.

In line with a third property of preferred embodiments of the invention, the key dispenser medium is capable of decrypting and storing an encrypted source key provided by another key dispenser medium, and of encrypting the source key for forwarding to another key dispenser medium. This allows the key dispenser medium to duplicate a key dispenser (in this case a 'Key Dispenser' refers to a key dispenser medium with a source key stored thereon) onto a 'Blank' key dispenser medium.

In the approach based on the third property, the source key is issued only in encrypted form and, by way of example, only after a further security element, for example a PIN, has been input. Alternatively or in addition, the further security element required may be the forwarding of a (for example encrypted) specific code (uniqueness number of the like) for the key dispenser medium that is to have information written to it. By way of example, this specific code is requested at the start of the process by the key dispenser medium that is to have information written to it. This additional security feature has the advantage that an abusively stored data packet with the encrypted source key cannot also be used to generate further key dispensers. The security feature may be required for all first processor means and possibly also for the third processor means, for example provided that they can have information written to them online, or else only for a selection of processor means.

For the purpose of the encryption, the key dispenser media may be provided, during manufacture, with a security key which is not known to the operator of the identification system (a separate security key may be provided for each operator, or the security key may be identical for a plurality of operators or even for each operator without security problems arising therefrom). The security key is used for decrypting—and in the case of symmetrical encryption, also for encrypting—the source key and is integrated in the first integrated circuit such that it can never be issued. As an alternative, it is also possible for asymmetric encryption to be provided, wherein at least the key required for decryption is a security key which is known only to the security chip.

For example, provision may be made—such an approach is known per se—for the security key not to be known to a single individual, but rather for it to be obtained from a combination of different key elements which are known to different persons/groups of persons.

With particular preference, the source key can be generated by the key dispenser medium itself.

All in all, the opportunity arises for an operator of the identification system to initialize the user media himself and to provide them with (derived) keys without having them produced by a central unit with appropriate security devices. Nevertheless, security is not adversely effected in comparison with existing systems, which will be explained in more detail in the description which follows. The user is also able to generate and manage a plurality of key dispenser media, which is advantageous when one of the media fails or is lost.

In line with one preferred refinement of embodiments with the third property, there may be two different types of key dispenser media. A first type of key dispenser media is capable of producing further key dispensers by means of duplication. Although a second type of key dispenser media—also called "reduced key dispenser medium" in this text—is able to derive derived keys from the source key—and possibly to initialize read and/or write devices as described below—it is unable to produce any other key dispensers.

In line with a first variant, this is accomplished by providing data produced by the first/second type of key dispenser medium with different designations. The integrated circuits of both types of key dispenser media disallow the storage of a source key if the data contained (in encrypted form) in the source key come from a reduced key dispenser medium. This can be prompted by appropriate configuration of the first integrated circuit.

In line with a second variant, the second type of key dispenser media is totally incapable of issuing the source key (in encrypted form).

The distinction between the first and second key dispensers allows finer gradation of authorizations by the operator.

The use of reduced key dispensers in line with the first variant is furthermore appropriate particularly when the encrypted source key is sent via a data line or a network, as described below. In that case, a person intercepting the data line without authorization is unable to generate a key dispenser from the encrypted source key even if a key dispenser medium blank is present.

In embodiments of the invention with a fourth advantageous property, an identification system can be set up such that the operator of the system is able to generate keys for daily use on user media himself. There are, thus, two mutually independent instances which contribute to producing the keys in use:
  the manufacturer of the identification system who provides the media (key dispenser media/user media/read and/or write devices), with security features therein, and
  the operator himself, who can generate the keys used entirely independently of the manufacturer.

In comparison with the prior art, this is more secure, since even a group of persons working for the manufacturer can never obtain all security features, since the keys themselves are produced by the operator. Furthermore, the approach is also less complex and sometimes less costly for the operator, since he is able to set up the entire system himself and also reconfigure it again if adjustments are necessary.

In embodiments with the fourth property, the operator is issued a set of parts, for example, which comprises at least one key dispenser medium—which preferably has the ability to generate the source key itself and is delivered as a key dispenser medium blank—and a plurality of user media, likewise without a key (or with a temporary key which is set up at the factory). The set preferably also includes an instruction which explains how the operator himself can generate source keys, derive derived keys therefrom and possibly duplicate key dispensers.

While each of the above advantageous properties can be implemented on its own on an identification system according to the invention, combinations of the above advantageous properties, which synergistically contribute together to increased security, to compatibility with existing identification technologies and to ease of handling by the operator, are particularly preferred, as can be seen more specifically from the explanations which follow and from the description of the exemplary embodiments. Arbitrary combinations of two, three or all four of the advantageous properties are part of the teaching according to the invention; quite particular preference is given to a combination of all four properties.

The statements which follow can—unless indicated otherwise—be applied to all properties and combinations of properties.

The key dispensers contain the source key and are set up to calculate a derived key from the source key and further parameters (for example a uniqueness number and/or an application index) and to issue said derived key. The key dispensers are provided as 'Masters' only to a restricted circle of users, for example only to a system responsibility holder. Furthermore, the key dispensers—or the first integrated circuits thereon—may be set up such that they make the issue of the encrypted source key and/or the issue of a derived key dependent on the input of an identification code (for example PIN). If an improper code is input multiple times, there may be provision for an automatic "reset", for example including the source key being deleted or rendered inaccessible. The first integrated circuits are monolithic in the sense that memory means and processor means are integrated in a common chip, and there are no data lines between the memory and the processor which are accessible without destroying the chip.

The first—and possibly also the third integrated circuit—may be in the form of a security chip, for example, which has both the memory means and the processor means. Security chips which output (certain) data only in encrypted form and which also render 'Reverse Engineering' at least more difficult are already known in principle. The first and possibly the third integrated circuits additionally have means, for example, on the basis of the source key and use further data (for example a uniqueness number and/or an application index) to calculate a derived key. Furthermore, the first integrated circuit can issue this derived key—possibly in encrypted form.

The key dispenser media may physically be in the form of chip cards, dongles, chip sets which are or can be integrated into a data processing appliance (slot etc.), etc. The physical form is not significant to the invention, and the monolithic integration of the memory containing the source key with the processor means which encrypt the latter and calculate the derived keys in a single chip is preferred in all cases.

The second media are user media. They contain a derived key calculated by a key dispenser. They are furthermore equipped to interchange data with a read and/or write device on a—preferably contactless—route and to perform an authentication process. By way of example, the data interchange between user media and a read and/or write device can be effected using radio frequency (RF) signals. In this case, an inherently known technology can be used, at the time of writing the present text for example Mifare® (a system based on ISO 14443A which is offered in different variants, including "Mifare Classic" and "Mifare DESfire"), or else FeliCa (ISO 18092), another system based on ISO 14443A, a system based on ISO 14443B, etc. In principle, it is possible to use any technology which allows the authentication of user media and of a read and/or write device using contactless or else contact-based data transmission. As is also explained in more detail below, an advantage of the identification system according to the invention is that a good security standard is provided which is independent of the built-in securities of the data transmission technology. The method steps which take place during the authentication are usually defined by the technology used (for example "Mifare Classic"). They may be based on the challenge-response method or on other approaches and are in some cases proprietary and not known; the invention works regardless of whether the authentication is performed using known or secret algorithms. The approach according to the invention merely provides the—derived—key; the way in which this is used for the authentication is of no significance to the invention.

The physical form of the user media may be any form which is known from the prior art, for example as a chip card (with an RFID chip—in this form also called an RFID 'Tag'—or other chip), as an RFID tag integrated in another medium (clock, mobile telephone, etc.), as a chip incorporated into a key, etc. New, alternative forms are also conceivable.

For the authentication, the read and/or write devices are the counterpart of the user media. The third integrated circuit is possibly able to calculate the possibly specific application key of the user medium, for example initially from parameters provided by the user medium (for example the uniqueness number and/or the application index). To this end, the third integrated circuit is then set up, for example like the first integrated circuit, to perform a calculation from the source key and these parameters using the same algorithm—for example a hash algorithm—as the first integrated circuit. The third integrated circuit is also preferably monolithic in the sense that memory means and processing means are integrated in a common chip, and there are no data lines between memory and processor which are accessible without destroying the chip. The third integrated circuit may have the physical design of the first integrated circuit, but the configuration is preferably chosen such that issue of the source key even in encrypted form is not possible, or that a key issued by a third integrated circuit is not adopted by a first or third integrated circuit.

The read and/or write devices may outwardly be designed like known read and/or write devices (for example from Mifare applications), wherein, in contrast to the known read and/or write devices, said third integrated circuit is present, which calculates the key required for the authentication.

The approach in accordance with the various embodiments of the invention has the following advantages: the 'Secret' of the identification system is the source key. The hardware of all elements in the system is set up such that the source key is not issued by any component of the system in unencrypted form. The source key may have been stored only by a first or possibly a third integrated circuit, and only a first or third integrated circuit is able to store the source key (system-external media are totally unable to decrypt the key, even if it is available to them in encrypted form). The first and third integrated circuits may be in the form of chips, for example security chips, produced/configured specifically for the application. This, in turn, allows the third integrated circuits to be configured such that they do not issue the source key or a derived key under any circumstances, not even in encrypted form. It is thus possible to use the design of the first and possibly third integrated circuit to ensure that only the key dispenser media can act as key dispensers, and only the key dispenser media can generate further key dispenser media by forwarding the encrypted source key.

As a result, the forwarding of the source key and the production of derived keys can be controlled perfectly. Only someone who is physically in possession of a key dispenser medium is able to generate applications keys and possibly create further key dispenser media—regardless of the design of the second media, and what means (computer with Smart Card Reader (RFID write module, etc.) are used to write information thereto.

The key dispenser medium is not needed in the everyday operation of the identification system, however, and can be stored securely and in seclusion, for example in a safe (physical security).

Provided that the source key can be generated by the operator, it does not need to be known to the manufacturer (system provider). The security key is known at most to the manufacturer, and by way of example to nobody. The security chips used can be produced only by the manufacturer. All in all, a very secure system is obtained which provides good protection against abuse.

BRIEF DESCRIPTION OF THE DRAWINGS

Properties and exemplary embodiments of the invention are discussed below with reference to schematic figures, in which.

DETAILED DESCRIPTION OF THE INVENTION

Figure 1:
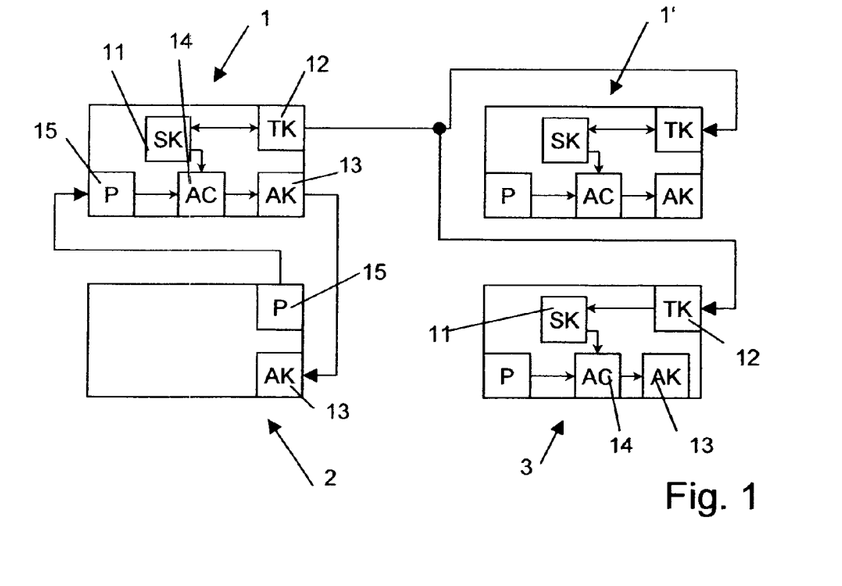
FIG. 1 shows a scheme for the initialization of components of an embodiment of an identification system according to the invention.
Figure 2:
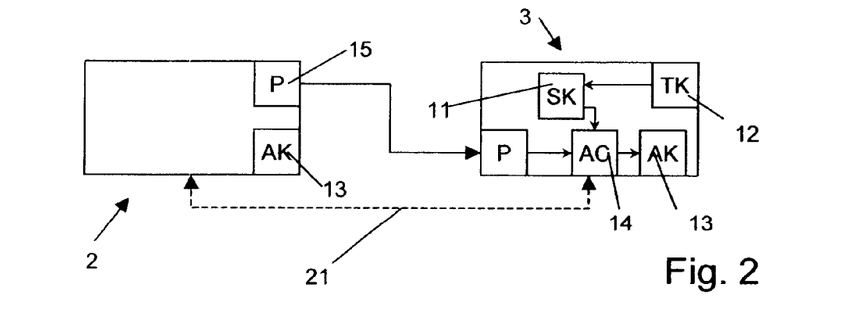
FIG. 2 shows a scheme for the interchange of information in the embodiment shown in FIG. 1 during daily operation.

FIGS. 1 and 2 schematically show components of an identification system according to the invention. These components may be physically in the form of chips or 'Tags' of the type mentioned above, or may have such chips. In addition to the outlined data memory means and data processing means, there are generally further means which prompt the actual data interchange, for example antennas, amplifier means (which apply a signal to an antenna) etc., or else contact areas, etc. Since the precise form of these further means is not relevant to the invention, it is not discussed further at this juncture.

As FIG. 1 shows, a key dispenser medium 1 holds a source key 11 and a security key 12. The security key 12 is used to encrypt the source key; it can never be read from the key dispenser medium. The source key is stored in a writeable, for example nonvolatile, memory of the key dispenser medium. The internal wiring of the key dispenser medium does not allow the source key 11 to be read off externally, and the wiring and/or the firmware of the key dispenser medium does not allow the source key 11 to be issued without encryption. Besides means for encrypting the source key 11 with the security key 12, the key dispenser medium has further data processing means 14 for calculating a derived key 13 from the source key and further parameters 15, such as the uniqueness number and/or an application number, etc.

Besides a (preferably writeable, non-volatile) memory 15 with a uniqueness number, application number and/or other, for example application-dependent, data, the user medium 12 also has a memory location for a derived key. The user medium may be designed and configured in the manner of inherently known user media from identification systems, for example, and the relevant data processing means, for example for encrypting data with the derived key, may also be implanted.

In a similar manner to the key dispenser medium, the electronics module of the read and/or write device 3 has a security key 12 and memory locations for the source key 11 and also data processing means 14 for calculating a derived key 13 on the basis of the source key 11 and further parameters 15 such as the uniqueness number and/or an application number, etc. Before the identification system is initialized, the user is provided with at least one key dispenser medium 1 (preferably a plurality of key dispenser media) and a plurality of second media 2, and read and/or write devices are provided with third integrated circuits. The key dispenser media and the third integrated circuits are already provided with the security key; the security key is not disclosed to the user. All media and all read and/or write devices are in a basic state, in which they have no source or derived keys, for example, apart from possible temporary keys which are prescribed during manufacture and which cannot ensure the entire security.

The initialization of the identification system may involve the following method steps taking place:

First of all, upon initialization by the user, the source key 11 can be ascertained in a key dispenser medium, for example as a random number, for example having at least 64 bits, preferably at least 128 bits, particularly preferably at least 256 bits. This turns the medium into a key dispenser (master).

The key dispenser (the initialized key dispenser medium) can then optionally be duplicated by writing to a further key dispenser medium. It is advantageous if the user has at least one duplicate of the key dispenser so that it can continue to operate and service the identification system in the event of a key dispenser being lost or faulty.

In the case of the duplication process too, the source key never leaves the key dispenser medium in unencrypted form, but rather in a form encrypted with the security key 12. The target medium 1' onto which the key dispenser is duplicated likewise has the security key 12 and can decrypt the security key 12 and store it in the provided memory.

The key dispenser 1 can also be used to initialize the read and/or write device 3 with the third integrated circuit. For this purpose, as FIG. 1 shows, the source key 11 is likewise read into the memory provided for this purpose. In the presence of the key dispenser, the read and/or write device can also be programmed with regard to functions, access or entry rights, etc., by a programming appliance which is provided for this purpose.

The issue of the source keys by the master may be linked to a further security element, for example the input of a PIN. For this purpose, the key dispenser medium and also the read and/or write device may have means for reading in such a PIN (or the like) which have been input by the user using a suitable input means—for example a computer, via which the key dispenser medium is connected by means of card reader or interface, or a programming appliance which can contact a read and/or write device contactlessly—or have been read in by suitable means; this also includes the possibility of requesting biometric data.

A user medium 2 is initialized by calculating the derived key 13 using the parameters 15—which have been provided by the user medium 2 beforehand, for example—in the key dispenser medium 1. Subsequent to the calculation, the derived key 13 is stored in the memory location provided for this purpose in the user medium.

In use, as FIG. 2 shows, a communication link is set up between the user medium and the electronics module 3 of the read and/or write device. First of all, the user medium-specific parameters 15 are transmitted to the third integrated circuit 3, as a result of which the latter is capable of calculating the derived key 13 from the source key 11 and these parameters 15. The derived key does not need to be stored permanently (even if permanent storage of the derived key is an option), but rather can be calculated afresh for every data interchange with a user medium.

As soon as the user medium 2 and the third integrated circuit of the read and/or write device 3 are in possession of the (identical) derived key 13, the authentication process can take place, and read and/or write processes can take place on the memory means of the user medium 1 and/or on the memory means of the read and/or write device. The data interchange taking place during the authentication process—said data interchange may be based on the challenge-response principle or on another principle—can be performed in a manner which is known per se from the prior art. By way of example, it is possible for a known, proprietary or standardized protocol to be used. One of the strengths of the invention is that the security features and practical advantages of the approach according to the invention are independent of the protocols used for the authentication and for the data interchange and that it is therefore possible to use any suitable protocols. Sometimes, the persons with the user medium 2 do not need to be aware at all that the identification system differs from the art (for example "Mifare Classic") by virtue of additional security features.

FIGS. 3a to 6 show possible physical forms of and media and electronics modules from the components of identification systems according to the invention. However, the implementation of a system according to the invention is not dependent on the components used. It is possible to use media/modules which are in a form other than the media/modules shown; FIGS. 3a to 6 merely show a few possible examples.

Figure 3A:
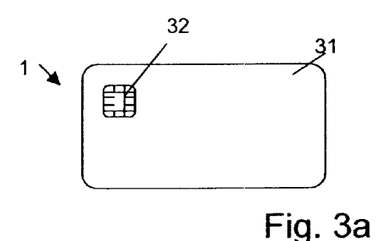
FIGS. 3a-3e show possible physical forms of a key dispenser medium.

The key dispenser medium 1 shown in FIG. 3a is in the form of a "Smart Card" (chip card) 31 with a chip 32. The chip 32 is a security chip of the type mentioned which incorporates both memory means and processor means in a monolithic design. The data interchange described above is effected using a, by way of example, conventional chip card reader. By way of example, such a chip card reader may be connected to a computer which performs the data interchange. On the basis of the approach in accordance with various embodiments of the invention, a source key 11 will at no time be located in unencrypted form in a data memory of the computer. The computer may have an RFID reader and writer connected to it at the same time as the chip card reader, which means that the data interchange shown in FIG. 1 between the key dispenser medium 1 and the user medium 2 can be performed directly, online. However, it is also conceivable for the data interchange to be performed with a time offset, by calculating and reading a plurality of derived keys 13, for example, together with the parameters 15 into the computer and subsequently initializing a plurality of user media.

Figure 3B:
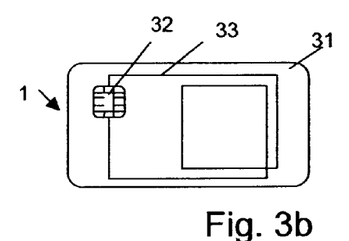

The chip card 31 shown in FIG. 3b, which can likewise be used as a key dispenser medium, differs from that shown in FIG. 3a in that it has a radio frequency antenna 33 in a direct communication link to the chip 32. When the chip 32 is supplied with current, it can use this antenna to interchange data directly with an RFID medium, for example with a user medium 2 in the form of an RFID chip or with an offline read and/or write unit, the (for example only) communication interface of which is an RFID communication interface.

Figure 3C:
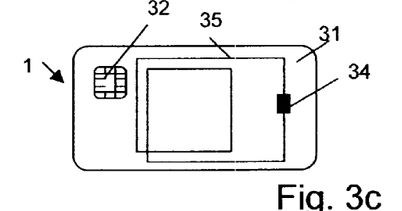

The chip card shown in FIG. 3c also has, in addition to the chip 32, an RFID chip 34 with an RFID antenna 35. This RFID chip 34 can have the encrypted source key 11 written to it online (while the chip card is connected to a computer for the purpose of communication), for example. Said RFID chip then transmits the encrypted source key 11 to an offline read and/or write unit, the (for example only) communication interface of which is an RFID communication interface. The functionality of the chip card 31 shown in FIG. 3c is thus very similar to that shown in FIG. 3b.

Figure 3D:
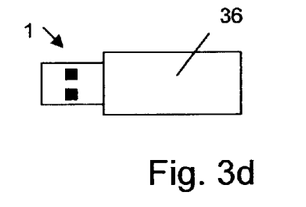

FIG. 3d shows the key dispenser medium 1 as a USB dongle 36. The dongle incorporates the security chip, which may be physically identical to the chip 32 of the chip cards. The functionality of the key dispenser medium shown in FIG. 3d is identical to that of the key dispenser medium shown in FIG. 3a, but with no chip card reader being required. Instead of a USB interface, such a dongle may naturally also have another interface.

Figure 3E:
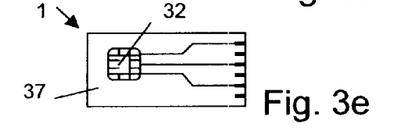

FIG. 3e shows a security chip 32 which is mounted directly on a printed circuit board 37 and is contact-connected by the latter, such a printed circuit board possibly being in the form of a plug-in card for a computer, for example. It is also conceivable for the security chip 32 to be mounted onto an already existing board in a computer.

An identification system in accordance with the invention may have only key dispenser media 1 which are in the same form, or any combinations are conceivable. However, it is preferred for the security chip to be of respectively identical design and functionality even in the case of different media, that is to say for the different media to differ only in terms of how the data interchange with the chip takes place.

Figure 4:
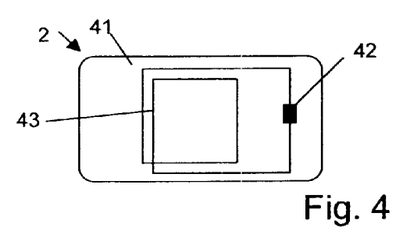
FIG. 4 shows a form of a user medium.

FIG. 4 shows a possible user medium 2. This is in the form of a chip card 41 with an RFID chip 42 having an RFID antenna 43. Instead of on a chip card, the RFID chip and the RFID antenna may also be on another support, for example integrated in an appliance with yet other functions (mobile telephone, clock, etc.), on a chip card cover, etc.

Figure 5A:
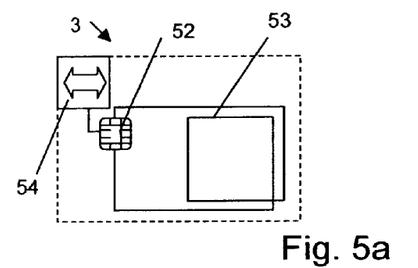
FIGS. 5a and 5b show elements of various embodiments of a read and/or write unit.

FIG. 5a schematically shows an electronics module for a read and/or write device 3. In addition to a chip 52, which is in the form of a security chip such as that of a key dispenser medium (but, as mentioned, with a slightly different configuration), and an RFID antenna 53 for the data interchange with a user medium, the read and/or write device 3 also has an interface 54 for the data interchange with a control center. The read and/or write device shown in FIG. 5a is accordingly an example of a read and/or write device which is suitable for an 'online' read and/or write device which can be initialized and programmed form the control center. At least for the initialization, and preferably also for the programming, the control center will have a key dispenser medium which is connected to a computer in the control center for the purpose of communication, for example. For the initialization, the encrypted source key is sent to the chip 52 via data lines and via the interface 54, for example.

Figure 5B:
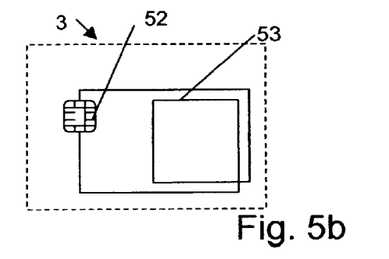

The read and/or write device 3 from FIG. 5b differs from that in FIG. 5a in that there is no interface. The read and/or write device is suitable for an 'offline' read and/or write device and needs to be initialized and possibly programmed by means of RFID data interchange, for example using an appropriate RFID programming appliance with a chip card reader in conjunction with a key dispenser medium as shown in FIG. 3a, or using a key dispenser medium as shown in FIG.

3b or 3c. As a further alternative, an auxiliary medium can be used for this purpose, as is described below.

Figure 6:
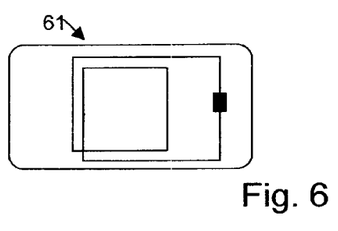
FIG. 6 shows a form of an auxiliary medium for transferring the source key to an offline read and/or write unit.

FIG. 6 shows an auxiliary medium 61 which may physically be in a form such as a user medium and does not necessarily differ therefrom. The auxiliary medium 61 is used for transmitting a (encrypted) source key 11 to an 'offline' read and/or write device and at the outside—depending on the configuration of the identification system and security demands for the programming of the read and/or write devices—also for the authentication to such an identification system for programming the read and/or write device. By way of example, such an auxiliary medium 61 can have information written to it by a computer which is connected to a key dispenser medium for the purpose of communication.

For all the media described, it is true that other communication channels can be used instead of or in addition to RFID technology, for example infrared, Bluetooth or other contactless interfaces, contact-based signal transmission, the capacitive-resistive coupling, etc.

Figure 7:
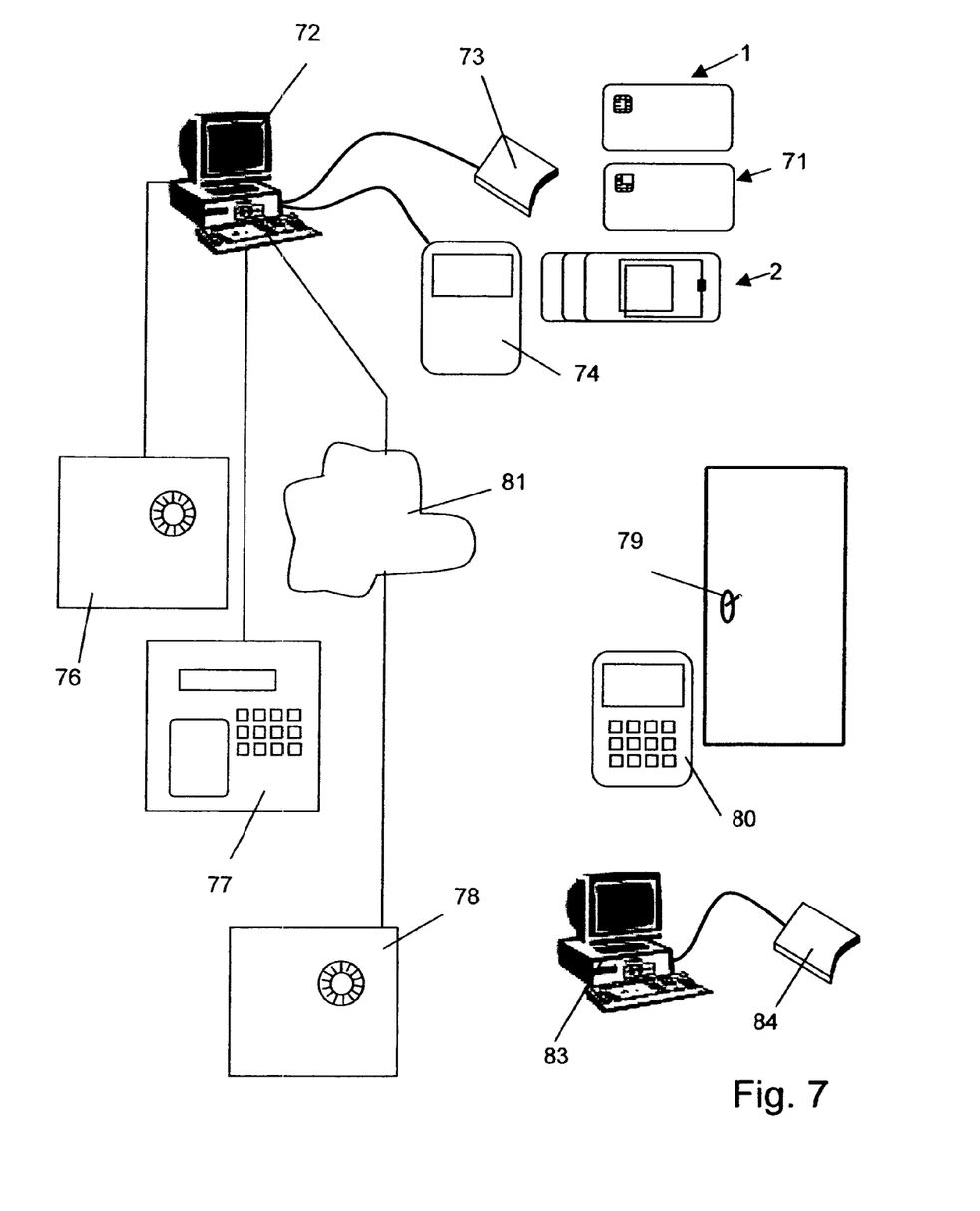
FIG. 7 shows a schematic illustration of components of an identification system according to the invention.

FIG. 7 is also used to show elements of a possible form of an identification system in accordance with the invention and to explain a few steps relating to the operation thereof. A control center, for example equipped with at least one suitable computer 72, of the operator of the identification system receives from the manufacturer at least one key dispenser medium 1 and, by way of example, at least one reduced key dispenser medium 71. Suitable means—in this case a chip card reader 73 connected to the computer—can be used to start the initialization process in a key dispenser medium and to produce a source key. The key dispenser medium provided with the source key in this manner becomes the first key dispenser. The computer, which can buffer-store the source key provided by the first key dispenser and encrypted with the preinstalled security key and can transmit it to other key dispenser media, is possibly used to produce further key dispensers and, by way of example, also to provide a reduced key dispenser medium with the source key. The presence of the encrypted source key in a computer buffer store is not a security risk, since it can be decrypted only by the key dispenser media and by the read and/or write devices. Preferably, the key dispenser media are additionally set up such that they issue the encrypted source key and possibly also derived keys only after a PIN has been input; if an incorrect PIN has been input multiple times, a key dispenser medium is automatically reset to the basic state, and the source key is deleted or rendered inaccessible. In addition or as an alternative, the data packet stored on the computer with the encrypted source key may also additionally have the—for example encrypted—uniqueness number of the key dispenser medium that is to have information written to it, and the key dispenser medium can have information written to it only in the event of consistency.

The first key dispenser or one of the further produced key dispensers or reduced key dispensers subsequently generates derived keys for the user media 2. For this purpose, either the uniqueness number and/or application number is read from the user media already provided therewith—this is done using an RFID read and write unit 74, which is likewise connected to the computer—or the application number and/or possibly also the uniqueness number is generated by the computer and is loaded onto the user media only during the initialization process. It is also possible for a plurality of application numbers with a respective derived key to be stored on a medium so that the user medium can perform a plurality of functions.

The derived key is read from the key dispenser by the computer and—possibly together with the application number and/or possibly the uniqueness number—loaded onto the integrated circuit (for example RFID chip) of the relevant user medium.

At the same time, beforehand or afterwards, the read and/or write devices are initialized. As examples of read and/or write devices, FIG. 7 schematically shows a security door 76 connected to the control center via a data line online, a data collection terminal 77 which is likewise connected to the control center online, a second security door, which can be contacted via the internet 81 and is located in a different building/building complex than the control center, a ("offline") door 79 which cannot be programmed via data lines from the control center, and a chip card reader 84, which in this case likewise cannot be contacted from the control center using data lines and which is connected to a computer 83.

For the initialization, the source keys are transmitted (in encrypted form) to the read and/or write devices via data lines (for 76-78) or (for 79 and 84) via an auxiliary medium 61, an RFID-compatible key dispenser, using an RFID-compatible chip card reader or via a suitable other interface of the read and/or write device. At the same time or subsequently, they are programmed by allocating appropriate authorizations (on the basis of application number and/or uniqueness number, on the basis of time, etc.), for example. The programming can be done online using the relevant data lines (for 76-78) or (for 79 and possibly 84) using a programming appliance 80. The read and/or write devices can also be reprogrammed at a later time at any time, a possible prerequisite for the reprogramming being the presence of a key dispenser and/or the input of security features (programming PIN etc.); in the former case, the read and/or write device requests the source key before it changes to a programming mode, for example. Instead of or at the same time as reprogramming, it is naturally also possible for data stored in the read and/or write device to be requested.

The PC 83 with chip card reader 84 is an example of the use of the invention for controlling access to a virtual entry point for a computer or computer network. In this case, the security chip may be in the chip card reader or in the computer (network) and authorize the access to the computer (network) as a whole or for particular applications; it goes without saying that it is also possible for the control center to be programmed via data lines, as in the case of the 'online' applications described above.

Following the initialization, the key dispensers—which are preferably all registered—are stored at a secure location, for example in a safe which is accessible only to a restricted group of people. If a key dispenser goes astray or there is another security gap, the read and/or write devices and the available (or recently delivered) key dispenser media are put into the basic state and reinitialized without the need for components to be interchanged. A prerequisite for the resetting of the read and/or write devices to the basic state is preferably the presence of at least one working key dispenser, i.e. so long as there is still one working key dispenser, reinitialization is possible at any time.

In addition to the read and/or write devices shown in FIG. 7, there may also be other read and/or write devices, for example with other functions, such as appliances for deregistering or loading the user media as value cards, etc. A special category of read and/or write devices are devices which do not have a third integrated circuit, therefore do not know the source key and are, for example, provided with a fixed application key. The security for transactions with such read and/or write devices is not as high, since manipulation by an unauthorized party can barely be controlled once the application key has been copied. Provision is therefore preferably made for special read and/or write devices of this kind to be able to be used only in secured spaces and/or for them to be able to read data only and the user media which do not allow the writing of data from such read and/or write devices. One possible application of such special read and/or write devices is time recording.

In line with one possible variant for the approach described above, the source key can, upon issue, also be encrypted asymmetrically instead of symmetrically with the security key. In that case, at least the decrypting key should be proprietary and known only to the first and third integrated circuits. Preferably, however, the encrypting key is also proprietary and known only to the relevant circuits so that an 'incorrect' key dispenser would be recognized if reprogramming of the read and/or write devices were attempted.

As a further variant, the process of duplicating a master can also take place via a data line at the same time.

The invention claimed is:

1. An identification system comprising:
   at least one user medium;
   wherein the medium is equipped to store a derived key and to use the derived key to authenticate itself to a read and/or write device,
   the identification system further comprising a first key dispenser medium which contains a monolithic first integrated circuit with memory means and processor means,
   wherein the first integrated circuit is equipped to decrypt and store an encrypted source key,
   wherein the first integrated circuit is equipped to derive the derived key from the source key and to forward said derived key for storage in the user medium,
   the identification system further comprising another key dispenser medium containing another monolithic first integrated circuit with memory means and processor means,
   wherein the first integrated circuit of the first key dispenser medium is equipped to encrypt the source key for forwarding to the other key dispenser medium,
   and wherein said other key dispenser medium is a reduced key dispenser medium which is capable of deriving the derived key from the source key and of forwarding it for storage in the user medium, and which is not capable of providing the source key in such an encrypted form that it can be decrypted and stored by yet another key dispenser medium or reduced key dispenser medium.

2. The identification system as claimed in claim 1, further comprising at least one read and/or write device, wherein the user medium and the read and/or write device are capable of performing an authentication process through data interchange, and wherein the read and/or write device comprises a monolithic third integrated circuit which is capable of storing the source key and of deriving the derived key therefrom.

3. The identification system as claimed in claim 2, wherein the first integrated circuit and the third integrated circuit are identical to one another apart from a configuration.

4. The identification system as claimed in claim 2, wherein the read and/or write device or at least one of the read and/or write devices is connected to a control center via a data line.

5. The identification system as claimed in claim 2, wherein the read and/or write device or at least one of the read and/or write devices is an "offline" read and/or write device and can be programmed by a programming appliance, wherein a prerequisite for at least one initialization of the read and/or write device is the presence of an encrypted source key provided by the key dispenser medium.

6. The identification system as claimed in claim 2, wherein the third integrated circuit is equipped to decrypt and store an encrypted source key provided by either key dispenser medium.

7. The identification system as claimed in claim 6, wherein every key dispenser medium contains a security key which can decrypt a key provided in encrypted form by another key dispenser medium, wherein the third integrated circuit comprises the security key.

8. The identification system as claimed in claim 1, wherein the user medium is not capable of reading the source key from the key dispenser medium, either directly or by using tools, and/or wherein the user medium is not capable of calculating a derived key.

9. The identification system as claimed in claim 8, wherein the derived key occurs on the basis of the source key and a uniqueness number and/or an application number for the user medium with a mathematically preferably non-reversible algorithm.

10. The identification system as claimed in claim 8, wherein the first key dispenser medium is capable of using a first interface to interchange data with another medium and the user medium is capable of using a second interface to interchange data with another medium, wherein the first and second interfaces are not compatible with one another.

11. The identification system as claimed in claim 10, wherein the second interface is an interface for non-contact data interchange, for example an RFID interface.

12. The identification system as claimed in claim 1, wherein the user medium comprises an RFID chip which is capable of storing the derived key.

13. The identification system as claimed in claim 1, wherein each first integrated circuit is a chip which can be read in a contact based fashion.

14. The identification system as claimed in claim 1, wherein the source key is decrypted by an unreadable security key which is present in every key dispenser medium.

15. The identification system as claimed in claim 1, wherein the first key dispenser medium is capable of using an initialization process to generate the source key itself.

16. The identification system as claimed in claim 1, wherein the simultaneous forwarding of a code, which is specific to the other key dispenser medium that is to have information written to it, can be made a prerequisite for the forwarding of a source key.

17. The identification system as claimed in claim 1, wherein the first key dispenser medium is capable of generating the source key itself.

18. A method for installing an identification system having at least one user medium which is equipped to use a derived key to authenticate itself to a read and/or write device, and having at least one key dispenser medium, comprising the following method steps:
   (a) issuing at least a first and a second key dispenser medium to an operator of the identification system, wherein the first and second key dispenser media are equipped to store a source key and to derive keys derived therefrom,
   (b) issuing a plurality of user media without keys or with identical keys to the operator, wherein the user media are capable of receiving and storing the derived key provided by the key dispenser medium,
   (c) generating, by the first key dispenser medium, the source key,
   (d) encrypting, by the first key dispenser medium, the source key, and forwarding the encrypted source key to the second key dispenser medium, (e) deriving, by the second key dispenser medium, at least one derived key from the source key, and (f) transmitting the derived key to at least one of the user media for storing therein, wherein said second key dispenser medium is a reduced key dispenser medium which is capable of deriving the derived key from the source key and for forwarding it for storage in the user medium, and which is not capable of providing the source key in such an encrypted from that it can be decrypted by yet another key dispenser medium or reduced key dispenser medium.

19. The method as claimed in claim 18, wherein at the time of issue to the operator, the at least one key dispenser medium has a security key and is capable of decrypting and storing an encrypted source key provided by another key dispenser medium, and of encrypting the source key for forwarding to another key dispenser medium, and also of deriving the derived key from the source key and of forwarding it for storage in the user medium.

\* \* \* \* \*